(12) United States Patent
Kwon et al.

(10) Patent No.: US 9,798,609 B2
(45) Date of Patent: Oct. 24, 2017

(54) BATTERY MANAGEMENT UNIT FOR PREVENTING PERFORMANCE OF ERRONEOUS CONTROL ALGORITHM FROM COMMUNICATION ERROR

(71) Applicant: LG CHEM, LTD., Seoul (KR)

(72) Inventors: Dong-Keun Kwon, Daejeon (KR); Jin-Seok Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 9 days.

(21) Appl. No.: 14/894,726

(22) PCT Filed: Jan. 27, 2015

(86) PCT No.: PCT/KR2015/000857
§ 371 (c)(1),
(2) Date: Nov. 30, 2015

(87) PCT Pub. No.: WO2015/111987
PCT Pub. Date: Jul. 30, 2015

(65) Prior Publication Data
US 2016/0110242 A1 Apr. 21, 2016

(30) Foreign Application Priority Data
Jan. 27, 2014 (KR) .......................... 10-2014-0009584

(51) Int. Cl.
*G06F 11/07* (2006.01)
*B60L 11/18* (2006.01)
(Continued)

(52) U.S. Cl.
CPC .......... *G06F 11/079* (2013.01); *B60L 3/0046* (2013.01); *B60L 11/1864* (2013.01);
(Continued)

(58) Field of Classification Search
CPC ............. G06F 11/0751; G06F 11/0736; G01R 31/3606; G01R 31/3658; G01R 31/3662;
(Continued)

(56) References Cited

U.S. PATENT DOCUMENTS 8,587,257 B2 * 11/2013 Murakami ............ B60L 3/0038
320/134
9,065,291 B2 * 6/2015 Park ....................... H01M 10/48
(Continued)

FOREIGN PATENT DOCUMENTS

JP 2006-164820 A 6/2006
KR 10-2010-0040579 A 4/2010
(Continued)

OTHER PUBLICATIONS

International Search Report issued in PCT/KR2015/000857 dated Apr. 24, 2015.
(Continued)

*Primary Examiner* — Nadeem Iqbal
(74) *Attorney, Agent, or Firm* — Birch, Stewart, Kolasch & Birch, LLP

(57) ABSTRACT

Disclosed is a battery management unit. The battery management unit according to the present disclosure can prevent performance of an erroneous control algorithm by executing an infinite loop when an error occurs on a communication line.

15 Claims, 3 Drawing Sheets

(51) Int. Cl.
*H02J 7/00* (2006.01)
*H01M 10/44* (2006.01)
*H01M 10/48* (2006.01)
*B60L 3/00* (2006.01)
*H01M 10/42* (2006.01)

(52) U.S. Cl.
CPC ...... *G06F 11/0736* (2013.01); *G06F 11/0751* (2013.01); *H01M 10/4257* (2013.01); *H01M 10/44* (2013.01); *H01M 10/48* (2013.01); *H02J 7/0026* (2013.01); *H01M 2010/4278* (2013.01); *Y02T 10/7055* (2013.01)

(58) Field of Classification Search
CPC .. G01R 31/361; G01R 31/36; G01R 31/3651; G01R 31/3624; G01R 31/362
See application file for complete search history.

(56) References Cited

U.S. PATENT DOCUMENTS

| | | |
|---|---|---|
| 2006/0197499 A1 | 9/2006 | Bucur et al. |
| 2007/0188141 A1 | 8/2007 | Hamaguchi et al. |
| 2012/0013201 A1 | 1/2012 | Pariseau et al. |
| 2012/0096298 A1 | 4/2012 | Noda et al. |
| 2012/0286575 A1* | 11/2012 | Park ............... H02J 7/0068 307/31 |
| 2013/0158762 A1 | 6/2013 | An et al. |

FOREIGN PATENT DOCUMENTS

| | | |
|---|---|---|
| KR | 10-1303164 A1 | 6/2013 |
| KR | 10-2013-0084875 A | 7/2013 |
| KR | 10-2008-0111997 A | 9/2013 |
| WO | WO 2007/106720 A2 | 9/2007 |

OTHER PUBLICATIONS

Written Opinion of the International Searching Authority issued in PCT/KR2015/000857 dated Apr. 24, 2015.

* cited by examiner

BATTERY MANAGEMENT UNIT FOR PREVENTING PERFORMANCE OF ERRONEOUS CONTROL ALGORITHM FROM COMMUNICATION ERROR

TECHNICAL FIELD

The present disclosure relates to a battery management unit, and more particularly, to a battery management unit for preventing an erroneous control algorithm from being run due to an error occurred in a communication line.

The present application claims priority to Korean Patent Application No. 10-2014-0009584 filed in the Republic of Korea on Jan. 27, 2014, the disclosures of which are incorporated herein by reference.

BACKGROUND ART

Due to its characteristics of being easily applicable to various products and electrical properties such as a high energy density, a secondary battery is not only commonly applied to a portable device, but universally applied to an electric vehicle (EV), a hybrid vehicle (HV), or an energy storage system that run on an electrical driving source. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure consisting of a plurality of cell assemblies connected in series, each cell assembly including a plurality of unit cells, to obtain high power. Also, the unit cell includes a positive electrode current collector and a negative electrode current collector, a separator, an active material, and an electrolyte solution, and allows repeated charging and discharging by electrochemical reactions between the components.

In addition to this basic structure, the battery pack further includes a battery management unit (BMU) to monitor and control a state of a secondary battery by applying an algorithm for control of power supply to a driving load such as a motor, measurement of electrical characteristic values such as current or voltage, charge/discharge control, voltage equalization control, and state of charge (SOC) estimation.

The battery pack is mounted on a battery operating system including a load which is supplied with power from the battery pack, and supplies power to the load. In this instance, the battery management unit may be electrically connected to the battery operating system through a communication line. Also, the battery management unit receives a command related to management of the battery pack including charge and discharge of the secondary battery included in the battery pack through the communication line.

However, when an error occurs in a signal received by the battery management unit through the communication line, operation of the battery pack may go wrong. There are various causes of the error in the signal such as physical damage to the communication line, or a program error or external hacking in the battery operating system.

When an error occurs in the received signal, an accident may happen such as overcharge and over-discharge of the battery pack, so there is a need for a battery management unit for preventing an erroneous control algorithm from being run due to an error occurred in communication.

DISCLOSURE

Technical Problem

The present disclosure is designed to solve the problem of the related art, and therefore the present disclosure is directed to providing a battery management unit for preventing an erroneous control algorithm from being run due to an error occurred in a communication line.

Technical Solution

To achieve the object, a battery management unit according to the present disclosure includes a microprocessor to analyze a signal received through a communication line, and execute a control algorithm including charge and discharge of a secondary battery based on the analyzed content of the signal, wherein the microprocessor determines whether an error is in the signal received through the communication line, and when the microprocessor detects an error in the received signal, the microprocessor executes an infinite loop algorithm.

According to an embodiment of the present disclosure, the microprocessor may determine whether an error occurred based on a pattern of the analyzed signal content.

According to another embodiment of the present disclosure, the microprocessor may determine whether an error occurred through determining whether the analyzed signal content is included in a preset control algorithm table.

According to still another embodiment of the present disclosure, the signal received through the communication line may include encryption information as well as the content related to the control algorithm of the secondary battery, and the microprocessor may determine whether an error occurred based on whether the encryption information included in the received signal matches pre-stored encryption information.

To achieve the object, a battery management unit according to the present disclosure includes an analysis unit to analyze a signal received through a communication line, and a control unit to execute a control algorithm including charge and discharge of a secondary battery based on the analyzed content of the signal, wherein the analysis unit determines whether an error is in the signal received through the communication line, and when the analysis unit detects an error in the received signal, the analysis unit executes an infinite loop algorithm.

According to an embodiment of the present disclosure, the analysis unit determines whether an error occurred based on a pattern of the analyzed signal content.

According to another embodiment of the present disclosure, the analysis unit may determine whether an error occurred through determining whether the analyzed signal content is included in a preset control algorithm table.

According to still another embodiment of the present disclosure, the signal received through the communication line may include encryption information as well as the content related to the control algorithm of the secondary battery, and the analysis unit may determine whether an error occurred based on whether the encryption information included in the received signal matches pre-stored encryption information.

To achieve the object, a battery management unit according to the present disclosure includes a microprocessor including a first core to analyze a signal received through a communication line, and a second core to execute a control algorithm including charge and discharge of a secondary battery based on the analyzed content of the signal, wherein the first core determines whether an error is in the signal received through the communication line, and when the first core detects an error in the received signal, the first core executes an infinite loop algorithm.

According to an embodiment of the present disclosure, the first core may determine whether an error occurred based on a pattern of the analyzed signal content.

According to another embodiment of the present disclosure, the first core may determine whether an error occurred through determining whether the analyzed signal content is included in a preset control algorithm table.

According to still another embodiment of the present disclosure, the signal received through the communication line may include encryption information as well as the content related to the control algorithm of the secondary battery, and the first core may determine whether an error occurred based on whether the encryption information included in the received signal matches pre-stored encryption information.

The battery management unit according to the present disclosure may be one component of a battery pack including the battery management unit and a plurality of secondary batteries.

The battery pack according to the present disclosure may be one component of a battery operating system including the battery pack and a load which is supplied with power from the battery pack. The load may be an electrical drive means or a portable device Advantageous Effects According to one aspect of the present disclosure, an infinite loop does not stop until a battery management unit is reset. Thus, it enables a manager to recognize that an error occurred in the battery management unit and resolve the error. Further, it prevents an accident from happening in a battery pack due to an erroneous control algorithm.

According to another aspect of the present disclosure, only a part connected to a communication line runs an infinite loop algorithm, while other part separately runs a control algorithm for overcharge prevention through voltage measurement of a secondary battery. That is, even though an error occurs in the communication line, a function, at a minimum, for accident prevention of the secondary battery is performed.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
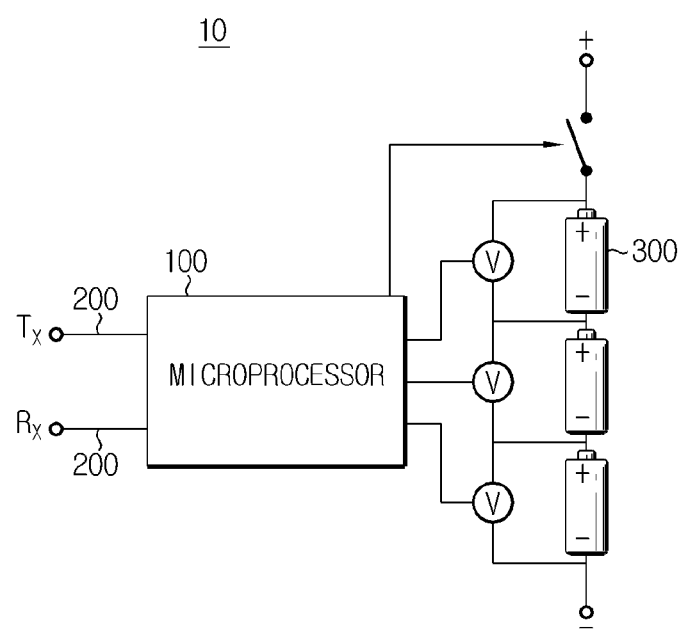
FIG. 1 is a schematic block diagram illustrating a portion of components of a battery management unit according to an embodiment of the present disclosure.

FIG. 1 is a schematic block diagram illustrating a portion of components of a battery management unit 10 according to an embodiment of the present disclosure.

Referring to FIG. 1, the battery management unit 10 according to the present disclosure includes a microprocessor 100.

The microprocessor 100 receives a signal through a communication line 200. Also, the microprocessor 100 transmits a signal through the communication line 200. The communication line may be connected to a higher-level controller which controls the battery management unit 10. The microprocessor 100 may transmit data associated with state of a secondary battery 300 for which it takes responsibility through the communication line 200, or receive a control signal related to charge and discharge of the secondary battery through the communication line 200.

The microprocessor 100 analyzes the signal received through the communication line 200. Also, the microprocessor 100 executes a control algorithm including charge and discharge of the secondary battery based on the analyzed content of the signal. The control algorithm may perform various control functions applicable on the ordinary level including measurement of electrical characteristic values such as voltage or current of each secondary battery 300, voltage equalization control, and state of charge (SOC) estimation. To do so, the microprocessor 100 includes a control algorithm designed to perform the various control functions.

The secondary battery 300 is not limited to a particular type. Each secondary battery 300 may include a lithium ion battery, a lithium polymer battery, a nickel cadmium battery, a nickel hydrogen battery, and a nickel zinc battery that are rechargeable and need to consider a charge or discharge voltage. Also, a number of secondary batteries 300 may be variously set based on a required output voltage or charge/discharge capacity. However, the present disclosure is not limited by a type, an output voltage, and a charge capacity of the secondary battery. Although FIG. 1 shows that the secondary batteries 300 are all connected in series, the present disclosure is not limited by a method of connecting the secondary batteries 300.

The microprocessor 100 determines whether an error is in the signal received through the communication line 200. Also, when the microprocessor 100 detects an error in the received signal, the microprocessor 100 executes an infinite loop algorithm. The infinite loop causes the microprocessor 100 to run a program endlessly, representing that a loop statement has no terminating condition or one that can never be met.

According to the present disclosure, the infinite loop does not stop until the microprocessor 100 is reset. Thus, it causes a manager to recognize that an error occurred in the battery management unit 10 and resolve the error. Further, it prevents an accident from happening in a battery pack due to an erroneous control algorithm.

According to an embodiment of the present disclosure, the microprocessor 100 determines whether an error occurred based on a pattern of the analyzed signal content. The pattern of signal content refers to a change in signal content between a currently received signal and a signal transmitted or received in the past. For example, if a signal containing the content of 'secondary battery charge start' is received, a signal that will be received next is a signal containing the content of 'secondary battery charge stop' or 'secondary battery discharge start'. However, if a signal containing the content of 'secondary battery charge start' is received again, the microprocessor 100 determines that an error occurred. As another example, assume the microprocessor 100 received a signal through the communication line 200 when the secondary battery 300 is fully discharged. If the content of the received signal contains 'secondary battery discharge start', the microprocessor 100 determines that an error occurred. These examples are provided for illustration only, and various embodiments may be contemplated in which it is determined whether an error occurred in communication using a pattern of signal content.

According to another embodiment of the present disclosure, the microprocessor 100 determines whether an error occurred through determining whether the analyzed signal content is included in a preset control algorithm table. The battery management unit 10 according to the present disclosure may include a memory device to store the preset control algorithm table. Thus, when the analyzed signal content does not correspond to the content in the preset control algorithm table, the microprocessor 100 determines that an error occurred.

According to still another embodiment of the present disclosure, the signal received through the communication line includes encryption information as well as the content related to the control algorithm of the secondary battery. Also, the microprocessor 100 determines whether an error occurred based on whether the encryption information included in the received signal matches pre-stored encryption information.

Figure 2:
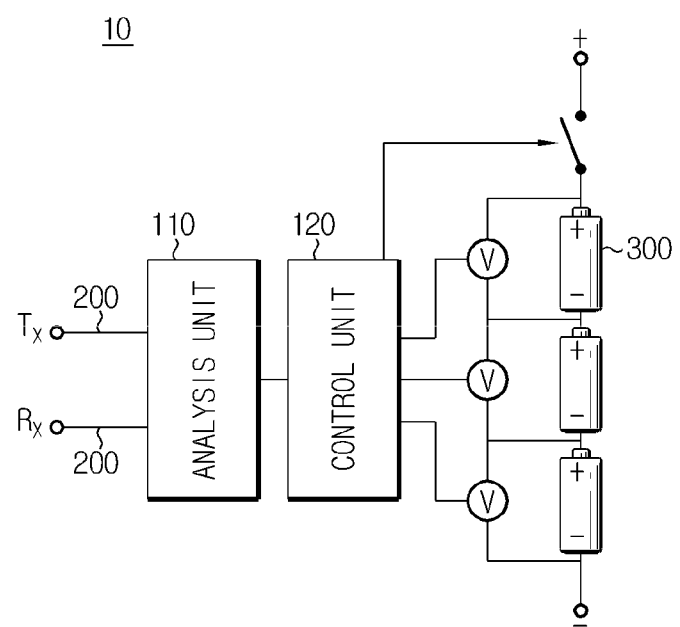
FIG. 2 is a schematic block diagram illustrating a portion of components of a battery management unit according to another embodiment of the present disclosure.

FIG. 2 is a schematic block diagram illustrating a portion of components of the battery management unit 10 according to another embodiment of the present disclosure.

Referring to FIG. 2, as opposed to the embodiment of FIG. 1, an analysis unit 110 and a control unit 120 are shown in place of the microprocessor 100. The battery management unit 10 according to the present disclosure does not use a microprocessor and may include at least two integrated circuit (IC) chips physically separated based on functions. Thus, the battery management unit 10 according to the present disclosure includes the analysis unit 110 to analyze a signal received through the communication line 200 and the control unit 120 to execute a control algorithm including charge and discharge of the secondary battery 300 based on the analyzed content of the signal. Also, the analysis unit 110 determines whether an error is in the signal received through the communication line 200, and when the analysis unit 110 detects an error in the received signal, executes an infinite loop algorithm.

According to the present disclosure, only the analysis unit 110 connected to the communication line 200 executes an infinite loop algorithm, and thus, the control unit 120 may separately execute a control algorithm for overcharge prevention through voltage measurement of the secondary battery 300. That is, even though an error occurs in the communication line 200, a function, at a minimum, for accident prevention of the secondary battery may be performed. The specific functions of the analysis unit 110 and the control unit 120 are the same as the functions of the microprocessor 100 shown in FIG. 1, and the duplicated description will be omitted herein.

According to an embodiment of the present disclosure, the analysis unit 110 determines whether an error occurred based on a pattern of the analyzed signal content.

According to another embodiment of the present disclosure, the analysis unit 110 determines whether an error occurred through determining whether the analyzed signal content is included in a preset control algorithm table.

According to still another embodiment of the present disclosure, the signal received through the communication line includes encryption information as well as the content related to the control algorithm of the secondary battery. Also, the analysis unit 110 determines whether an error occurred based on whether the encryption information included in the received signal matches pre-stored encryption information.

Figure 3:
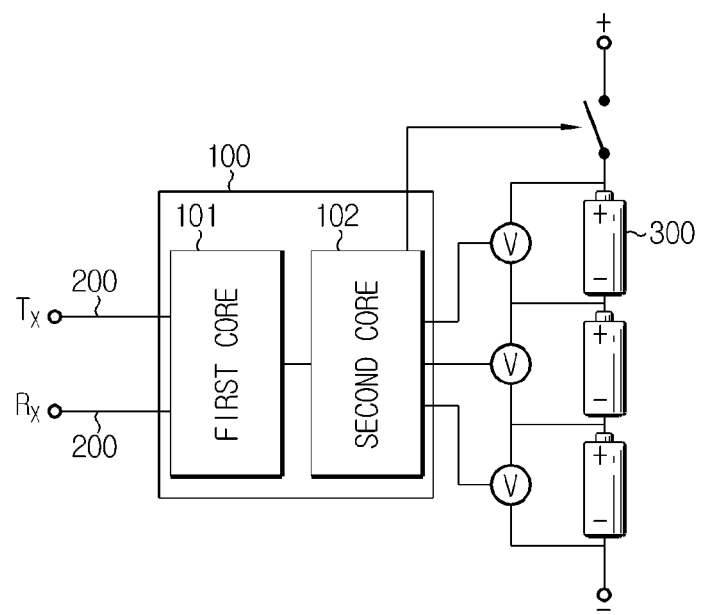
FIG. 3 is a schematic block diagram illustrating a portion of components of a battery management unit according to still another embodiment of the present disclosure.

FIG. 3 is a schematic block diagram illustrating a portion of components of the battery management unit 10 according to still another embodiment of the present disclosure.

Referring to FIG. 3, as opposed to the embodiment of FIG. 1, a first core 101 and a second core 102 are shown inside the microprocessor 100. The microprocessor 100 included in the battery management unit 10 according to the present disclosure may be a device including at least two cores. In this instance, one core (first core) may serve to analyze a signal received through the communication line 200, and the other core (second core) may serve to execute a control algorithm including charge and discharge of the secondary battery based on the analyzed content of the signal. That is, each core physically separated inside the microprocessor executes an algorithm based on the functions for which the cores take responsibility. In this instance, the first core 101 determines whether an error is in the signal received through the communication line, and when detecting an error in the received signal, executes an infinite loop algorithm.

According to the present disclosure, only the first core 101 connected to the communication line 200 executes an infinite loop algorithm, and thus, the second core 102 may separately execute a control algorithm for overcharge prevention through voltage measurement of the secondary battery 300. That is, even though an error occurs in the communication line 200, a function, at a minimum, for accident prevention of the secondary battery may be performed. The specific functions of the first core 101 and the second core 102 are the same as the functions of the microprocessor 100 shown in FIG. 1, and the duplicated description will be omitted herein.

According to an embodiment of the present disclosure, the first core 101 determines whether an error occurred based on a pattern of the analyzed signal content.

According to another embodiment of the present disclosure, the first core 101 determines whether an error occurred through determining whether the analyzed signal content is included in a preset control algorithm table.

According to still another embodiment of the present disclosure, the signal received through the communication line includes encryption information as well as the content related to the control algorithm of the secondary battery. Also, the first core 101 determines whether an error occurred based on whether the encryption information included in the received signal matches pre-stored encryption information.

The battery management unit 10 according to the present disclosure may be one component of a battery pack including the battery management unit and a plurality of secondary batteries.

The battery pack according to the present disclosure may be one component of a battery operating system including the battery pack and a load which is supplied with power from the battery pack. The battery operating system may include, for example, an electric vehicle (EV), a hybrid electric vehicle (HEV), an electric bike (E-Bike), a power tool, an energy storage system, an uninterruptible power supply (UPS), a portable computer, a mobile phone, a portable audio device, and a portable video device, and the load may include, for example, a motor that generates a rotational force by power supplied from the battery pack, or a power inverter circuit that inverts power supplied from the battery pack to power required for various circuit components.

In the description of the present disclosure, it should be understood that each element of the present disclosure shown in FIGS. 1 through 3 is distinguished logically rather than physically.

That is, each element corresponds to a logic element to realize the technical spirit of the present disclosure, and accordingly, even though each element is integrated or separated, it should be construed as falling within the scope of the present disclosure if a function performed by a logic element of the present disclosure can be implemented, and it should be understood that it falls within the scope of the present disclosure regardless of whether names are identical or not if it is an element performing an identical or similar function.

While the present disclosure has been hereinabove described in connection with only a limited number of embodiments and drawings, the present disclosure is not limited thereto and it should be understood that various changes and modifications may be made by an ordinary person skilled in the art within the spirit and scope of the disclosure and the appended claims and their equivalents.

What is claimed is:

1. A battery management unit comprising:
a communication line;
a secondary battery; and
a microprocessor operatively connected to the communication line and the secondary battery, and configured to:
analyze content in a signal received through the communication line,
execute a first algorithm to control charge and discharge of the secondary battery based on the analyzed content of the received signal,
determine whether an error is in the signal received through the communication line, and
when the microprocessor detects the error in the received signal, change from executing the first algorithm to control the charge and discharge of the secondary battery based on the analyzed content of the signal, to a second algorithm that is an infinite loop algorithm.

2. The battery management unit according to claim 1, wherein the microprocessor determines whether the error occurred based on a pattern of the analyzed signal content.

3. The battery management unit according to claim 1, wherein the microprocessor determines whether the error occurred by determining whether the analyzed signal content is included in a preset control algorithm table.

4. The battery management unit according to claim 1, wherein the signal received through the communication line includes encryption information as well as the content related to the first algorithm of the secondary battery, and wherein the microprocessor determines whether the error occurred based on whether the encryption information included in the received signal matches pre-stored encryption information.

5. A battery management unit comprising:
a communication line;
a secondary battery;
an analysis unit to analyze content in a signal received through the communication line; and
a control unit to execute a first algorithm to control charge and discharge of the secondary battery based on the analyzed content of the received signal,
wherein the analysis unit determines whether an error is in the signal received through the communication line, and when the analysis unit detects the error in the received signal, the analysis unit controls the charge and discharge of the secondary battery based on the analyzed content of the signal by executing a second algorithm that is an infinite loop algorithm.

6. The battery management unit according to claim 5, wherein the analysis unit determines whether the error occurred based on a pattern of the analyzed signal content.

7. The battery management unit according to claim 5, wherein the analysis unit determines whether the error occurred through determining whether the analyzed signal content is included in a preset control algorithm table.

8. The battery management unit according to claim 5, wherein the signal received through the communication line includes encryption information as well as the content related to the first algorithm of the secondary battery, and wherein the analysis unit determines whether the error occurred based on whether the encryption information included in the received signal matches pre-stored encryption information.

9. A battery management unit comprising:
a communication line;
a secondary battery; and
a microprocessor operatively connected to the communication line and the secondary battery, and comprising:
a first core to analyze content in a signal received through the communication line; and
a second core to execute a first algorithm to control charge and discharge of the secondary battery based on the analyzed content of the received signal,
wherein the first core determines whether an error is in the signal received through the communication line, and when the first core detects the error in the received signal, the first core controls the charge and discharge of the secondary battery based on the analyzed content of the signal by executing a second algorithm that is an infinite loop algorithm.

10. The battery management unit according to claim 9, wherein the first core determines whether the error occurred based on a pattern of the analyzed signal content.

11. The battery management unit according to claim 9, wherein the first core determines whether the error occurred through determining whether the analyzed signal content is included in a preset control algorithm table.

12. The battery management unit according to claim 9, wherein the signal received through the communication line includes encryption information as well as the content related to the first algorithm of the secondary battery, and wherein the first core determines whether the error occurred based on whether the encryption information included in the received signal matches pre-stored encryption information.

13. A battery pack comprising:
a battery management unit according to claim 1; and
a plurality of secondary batteries.

14. A battery operating system comprising:
a battery pack according to claim 13; and
a load which is supplied with power from the battery pack.

15. The battery operating system according to claim 14, wherein the load is an electrical drive means or a portable device.

* * * * *